July 17, 1962 E. L. JOHNSON 3,045,212

CHECKING CIRCUIT

Filed Sept. 26, 1956 2 Sheets-Sheet 1

INVENTOR.
ELLSWORTH L. JOHNSON

BY Theodore C. Wood

AGENT

United States Patent Office 3,045,212
Patented July 17, 1962

3,045,212
CHECKING CIRCUIT
Ellsworth L. Johnson, Billerica, Mass., assignor to International Business Machines Corporation, New York, N.Y., a corporation of New York
Filed Sept. 26, 1956, Ser. No. 614,775
8 Claims. (Cl. 340—172.5)

This invention relates to checking circuits and more particularly to checking circuits in digital signaling systems.

In digital signaling systems it is sometimes desirable to transform the signals from one form into another as for example to transform parallel signals into serial signals or to transform signals of one code to signals of another code. In such systems it is conventional to employ checking circuits of the type known as "odd-even" checking. "Odd-even" checking circuits are oftentimes referred to as single error detecting circuits since in those previously known circuits, an even number of errors would not be detected. In systems where several signals are delivered to the signal transforming device for simultaneous transformation an "odd-even" checking circuit of the previously known type will not satisfactorily detect errors since if errors are made there is a high probability of an even number of errors taking place.

In accordance with the principles of this invention, a count is made of the number of units of intelligence which are delivered to the signal transforming device and another count is made of the number of transformations which were effected by the signal transforming device and if the counts do not agree, the checking circuit generates a suitable signal. These counting operations are preferably performed by the same checking circuit which performs an "odd-even" check and therefore the probability of an error taking place which is not detected is greatly reduced even though the complexity of the checking circuit is not materially increased.

It is an object of this invention to provide an improved checking circuit for digital signalling systems which is simple, reliable and easily manufactured.

It is another object of this invention to provide an improved checking circuit for digital signalling systems of the type employing a transformation device wherein the number of signals to be transformed and the number of actual transformations which take place are combined and a signal indicating the result of that combination is generated.

It is still another object of this invention to provide an improved checking circuit for digital signalling systems of the type employing a transformation device wherein a checking circuit not only performs an odd-even check of the signals delivered from the transformation device but also performs a check on the number of transformations which take place as compared to the number of transformations required.

It is a still further object of this invention to provide an improved checking circuit for digital signalling systems of the type employing a parallel to serial conversion device wherein a checking circuit adds the number of signals in parallel form to be converted to serial form and the number of serial signals produced and generates a signal indicating the result of that addition.

Still another object of this invention is to provide an improved checking circuit for digital signalling systems of the type employing a storage array having a plurality of signal storage registers wherein the number of signals in parallel form delivered to the storage registers is added to the number of signals delivered from the registers in serial form and a signal is generated which indicates the result of that addition.

Another object of this invention is to provide an improved checking arrangement for digital signalling systems wherein a magnetic core storage array comprising a plurality of signal storage registers has information signals in parallel form stored in a selected one of the registers by coincident energization of address and data conductors, the energization of an address conductor of a given register causes a stage of that register to store the fact that the register has been addressed, a bistable device changes its existing stable state each time that any one of the address conductors is energized and each signal delivered from the stages of the registers also causes the bistable device to change its state.

Other objects of the invention will be pointed out in the following description and claims and illustrated in the accompanying drawings, which disclose, by way of example, the principle of the invention and the best mode, which has been contemplated, of applying that principle.

*Conventions Employed*

Figure 1:
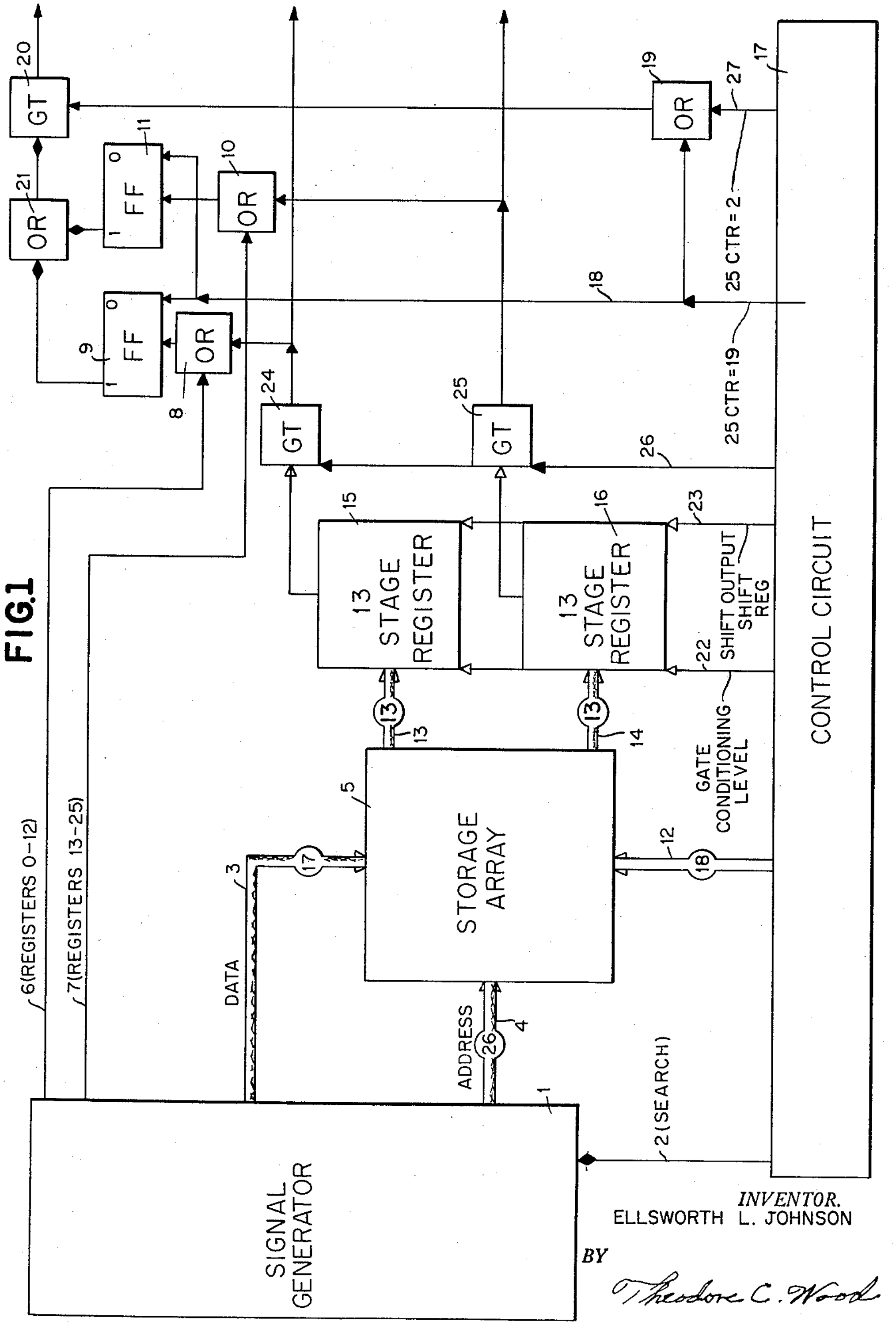
FIG. 1 is a schematic block diagram of a digital signalling system employing the principles of this invention.

Throughout the following description and in the accompanying drawings there are certain conventions employed which are familiar to certain of those skilled in the art. Additional information concerning those conventions is as follows:

In the block diagram figures of the drawing a conventional filled-in arrowhead is employed on lines throughout the drawing to indicate (1) a circuit connection, (2) energization with standard positive pulses and (3) the direction of pulse travel which is also the direction of control. A conventional un-filled-in arrowhead is employed on lines throughout the drawing to indicate the same things indicated by a conventional filled-in arrowhead except that the un-filled-in arrowhead illustrates a non-standard pulse generally having a duration considerably longer than the pulse represented by a filled-in arrowhead. A diamond-shaped arrowhead indicates (1) a circuit connection and (2) energization with a D.C. level. Cables which are used to transfer data are shown as two parallel lines with the arrowheads at one end thereof, and at some point intermediate the ends of those cables the two parallel lines are widened in the form of a circle, a number appearing within the circle. Cables employing the circle indicate that the lines or conductors of that cable convey information by the presence or absence of a pulse in parallel transfer. The number appearing within the circle of a cable indicates the number of conductors within the cable. The D.C. levels are on the order of 10 volts when positive and 30 volts when negative, whereas pulses indicated by conventional filled-in arrowheads are positive $\frac{1}{10}$ microsecond, half-sine waves having a magnitude of 20 to 40 volts. Pulses indicated by conventional unfilled-in arrowheads are usually considerably longer than $\frac{1}{10}$ microsecond in duration and those referred to hereinafter are in general on the order of 1 to 2 microseconds in duration. The input and output lines of the block symbols are connected to the most convenient side of the block including the same side in some cases. An input line to a corner of a block symbol and an output line from the adjacent corner of that block symbol indicates that the pulses or D.C. levels are applied to the input of the circuit represented by the block and the input conductor is electrically connected to the output conductor of the adjacent corner.

Bold face character symbols appearing within a block symbol identify the common name for the circuit represented, that is, FF identifies a flip-flop, GT a gate circuit, OR a logical OR circuit, and so forth.

Reference is now made to FIG. 1 which is a block diagram of a digital signalling system employing the principles of this invention. A signal generator 1, when receiving a positive D.C. level on conductor 2 (Search) delivers successive 17 bit data signals, if available, to the conductors of a cable 3. Data signals are delivered to the conductors of cable 3 by selectively energizing each conductor, that is, a conductor conveying a binary One signal is energized, whereas a conductor conveying a binary Zero is not energized. Each time that the signal generator 1 delivers data signals to the conductors of cable 3 it causes a selected one of the 26 conductors of a cable 4 to be coincidently energized.

The conductors of cables 3 and 4 are associated with a storage array 5 such that when data signals are delivered to the conductors of cable 3, those data signals are stored in a particular one of the 26 storage registers of the storage array 5, the particular one being that selected by the energized conductor of cable 4. Each time that data signals are delivered to the conductors of cable 3 for storage in the registers of the array 5 having addresses 0 through 12, the signal generator 1 delivers a pulse to a conductor 6 and each time that signals are delivered for storage in the registers of the array having addresses 13 through 25, the signal generator 1 delivers a pulse to a conductor 7. Pulses on conductor 6 are delivered through an OR circuit 8 to the complement or binary input of a flip-flop 9. Pulses on conductor 7 are delivered through an OR circuit 10 to the complement or binary input of a flip-flop 11.

When one of the conductors of cable 4 is energized to thereby select the one register of the array 5 into which the data signals on cable 3 are to be stored, one stage of that register (called a busy bit) is set to its binary One state.

Figure 2:
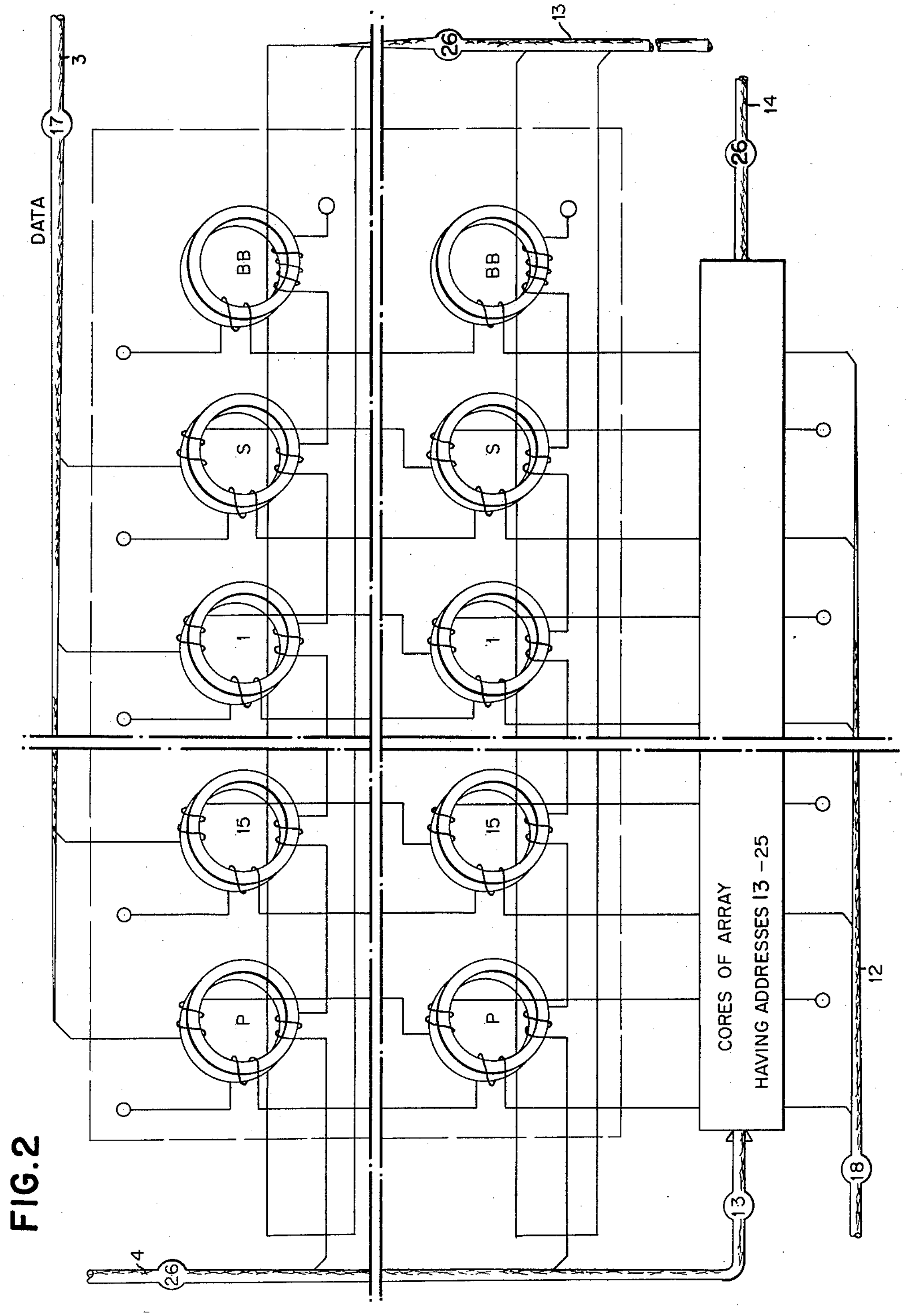
FIG. 2 is a schematic diagram illustrating the storage array shown as block 5 in FIG. 1.

Reference is now made to FIG. 2, which is a schematic diagram of the storage array shown as block 5 in FIG. 1. The magnetic cores of the storage array can be considered as forming rows and columns. A given data signal conductor of cable 3 threads all of the cores of a column whereas a given address conductor of cable 4 threads all of the cores of a row. A word represented by the 17 data bit signals on the conductors of cable 3 may, for example, be a sign bit, 15 numerical bits and a parity bit. in the interest of simplifying the description, only 5 cores of each row and only 2 rows have been shown in the drawing, the cores of each row being labeled BB, S, 1, 15 and P according to the information which they may store, that is, the S core stores the sign bit, the 1 core bit 1, the 15 core bit 15 and the P core the parity bit. In the illustrated embodiment of this invention the parity bit is made such that the total number of binary Ones in the word with its parity bit is an Even number. Energization of a given data conductor of cable 3 causes all of the cores of its associated column to be half-selected. Energization of a given address conductor of cable 4 causes all of the cores of its associated row to be half-selected with the exception of the busy bit (BB) core of that row which is fully selected. With this arrangement the data signals are stored in the selected row of cores (register) by setting those cores in the One state which are to store a binary One and the busy bit core of that row is set in its One state.

The array can be considered as logically divided into two groups of registers, one group for the registers having addresses 0 through 12 and the other group for those having addresses 13 through 25. Each column of the array has a read-out conductor and those 18 conductors make up a cable 12. When one of those conductors of cable 12 has been energized it causes each of the cores of its associated column to be driven to its Zero state and any core which had previously been in its One state will cause a signal to be induced in its associated sense winding. A given sense winding threads all of the cores of a row and is "folded-back" thereby resulting in a conductor pair. The conductor pairs of sense windings for registers having addresses 0 through 12 make up a cable 13 whereas the conductor pairs of sense windings for registers having addresses 13 through 25 make up a cable 14.

Referring back to FIG. 1, signals on a given conductor pair of cable 13 are stored in its corresponding stage of a 13 stage shifting register 15. Signals on a given conductor pair of cable 14 are stored in its corresponding stage of a 13 stage shifting register 16.

The operation of the apparatus thus far described is controlled by a control circuit 17. Although the control circuit 17 is cyclic in its operation, for the purpose of this description it will be assumed that the operation starts at the time that the control circuit 17 delivers a pulse to a conductor 18 (25 counter equals 19) which is the same time that a positive D.C. level is first established on conductor 2 (Search). A pulse on conductor 18 is delivered to the clear input of flip-flops 9 and 11 and is also delivered through an OR circuit 19 to sample a gate 20. Gate 20 is conditioned by the One output of flip-flops 9 and 11 through an OR circuit 21. For the purpose of the immediate description it will be assumed that flip-flops 9 and 11 are both in their Zero states when the control circuit 17 delivers a pulse to conductor 18 and therefore this pulse is ineffective.

Upon receipt of the positive D.C. level on conductor 2 (Search) the signal generator 1 may begin to deliver words for storage in the array 5. Each time that a word is delivered to the storage array 5, the signal generator also delivers a pulse to conductor 6 or conductor 7 dependent upon which of the two groups of registers of the array the word is being stored in. Since a pulse on conductor 6 causes a complementing operation of flip-flop 9, that flip-flop effectively keeps track, during the time that words are being written into the array, of the total number of words (odd or even) sent into registers having addresses 0–12. Flip-flop 11 performs a similar function with respect to words sent into registers of the array having addresses 13 through 25. When a given register of the array 5 is selected to store a word of data (by energizing its associated address conductor of cable 4) the busy bit core of that register is set in its One state. If the same register is selected again (erroneously) before the array has been read out, then of course the bits of the second word will OR together in the register with the bits of the first word but the busy bit core will remain in its One state just as though the register had been selected only once. The second word placed in a register as described will, however be counted by flip-flop 9 or 11 dependent upon which group the register is in.

After a predetermined length of time (sufficient to permit the signal generator 1 to fill the array) the control circuit 17 establishes a negative D.C. potential on conductor 2 thereby preventing any further writing operations from taking place in the array. Subsequently the control circuit 17 sequentially energizes the various read-out conductors of cable 12. The first conductor of cable 12 to be energized causes the busy bit cores to be read out. The busy bit cores of registers having addresses 0 through 12 deliver their signals for storage in 13 stage shift register 15 and those having addresses 13 through 25 deliver their signals for storage in 13 stage shift register 16. Each stage of registers 15 and 16 is preferably of the gated input type and therefore during read-out time of the array the control circuit 17 delivers a gate conditioning level by way of conductor 22 to those gates.

After a column of the array has been read out and those signals stored in the registers 15 and 16, the control circuit 17 delivers 13 shift commands by way of conductor 23 to those registers. The output of the last stage of 13 stage shift register 15 is delivered to the conditioning input of a gate 24 and the output of the last stage of the 13 stage shift register 16 is delivered to the conditioning input of a gate 25. Gates 24 and 25 are sampled by pulses on conductor 26 which are produced by control circuit 17 and occur during the signal output time of the shift registers. Each pulse passed by gate 24 is delivered through OR circuit 8 to the complement input of flip-flop 9 and each pulse passed by gate 25 is delivered through OR circuit 10 to the complement input of flip-flop 11.

The busy bits of registers having addresses 0 through 12 will therefore cause a number of complementing operations of flip-flop 9, the number being determined by how many of those registers had been selected during read-in time of the array. After the busy bits have been delivered from the shifting registers, the next column of the array is read out by the control circuit by energizing its read-out conductor of cable 12 and at the same time the control circuit 17 delivers a pulse to conductor 27 which is delivered through OR circuit 19 to sample gate 20. This pulse will be passed by gate 20 if flip-flop 9 or flip-flop 11 is in the One state. If the same register had been selected more than once during read-in time of the array then flip-flop 9 or 11 would cause gate 20 to be conditioned at the time it is sampled since it would have been complemented an Odd number of times.

Each binary One bit of the words stored in registers of the array having addresses 0 through 12 also cause complementing of flip-flop 9. In a similar manner the flip-flop 11 is complemented by the binary One bits of the words stored in registers having addresses 13 through 25. If the total number of binary Ones stored in either of those groups was an odd number then the flip-flop associated with that group will cause gate 20 to be conditioned after read-out of the array has been completed and at that time the control circuit 17 starts a new cycle that begins by sampling gate 20 as previously described.

Detailed descriptions of examples of component circuits suitable for use in the apparatus of FIG. 1 will be found in copending application Serial Number 612,266 entitled "Control Equipment," filed by R. J. Cypser et al. on September 26, 1956, and other applications therein referred to.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A digital signalling system comprising a signal storage array having a plurality of magnetic cores arranged coordinately in rows and columns, means to selectively store data signals in said rows of cores by coincident energization of data signal carrying conductors and address signal carrying conductors and to store a busy signal in one core of each row when that row has received an address signal on its address signal carrying conductor, and means to combine the number of said data signals stored in said storage array and the number of said busy signals stored in said array.

2. A digital signalling system comprising a signal storage array having a plurality of magnetic cores arranged coordinately in rows and columns, an individual address signal carrying conductor associated with each of said rows of cores such that when a given address conductor is energized it produces sufficient magnetizing force to cause one core of its associated row to assume a predetermined stable magnetic state and produces a magnetizing force on the other magnetic cores of its associated row which is insufficient within itself to cause those cores to change their previous stable magnetic state, an individual data signal carrying conductor associated with all but one of said columns of cores such that when a given data conductor is energized it produces a magnetizing force on all of the cores of its associated column which is insufficient within itself to cause those cores to change their previous stable magnetic state but the magnetizing force is sufficient that when coincidently combined with the magnetizing force produced by an address signal carrying conductor the core is caused to assume said predetermined state, an individual read out conductor associated with each column of cores such that when a given read out conductor is energized it causes all of the cores of its associated column to assume a stable magnetic state opposite to said predetermined state, a bistable device, means to selectively energize said data signal carrying conductors while coincidently energizing a selected one of said address signal carrying conductors a number of times according to the number of data signals to be stored and to cause said bistable device to change its existing stable state a number of times in accordance with said number of data signals to be stored and means to sequentially energize said read-out conductors and deliver the signals stored therein in serial form to said bistable device to thereby cause said bistable device to change its existing state in response to each signal stored in said array.

3. A signalling system comprising: a transformation means; a multi-function means for coincidently generating word and checking signals, there being one checking signal for each word signal generated, said checking signal designating the existence of said word signal; means for transferring said word signal into said transformation means; means operative in dependence upon said transferring means for generating an indicating signal in response to the transferring of said word signal; and means for combining said checking signal with said indicating signal to determine whether they agree.

4. A signalling system comprising: a transformation means, a multi-function means for coincidently generating word and checking signals, there being one checking signal for each word signal generated, said checking signal designating the existence of said word signal; means for sending said word signal to said transformation means; means for addressing said word signal into said transformation means; means operative in dependence upon said addressing means for generating an indicating signal in response to the addressing of said word signal into said transformation means; and means for combining said checking signal with said indicating signal to determine whether they agree.

5. A checking circuit comprising: a transformation means; a multi-function means for coincidently generating word signals and checking signals, there being one checking signal for each word signal generated, said checking signals designating the existence of a corresponding word signal; means for transferring said word signals into said transformation means; means operative in dependence upon said transferring means for generating an indicating signal for each of said word signals transferred; said indicating signals thereby having a relationship with said checking signals; combining means for combining said checking signals with said indicating signals; and means responsive to said combining means to designate the presence or absence of said relationship between said indicating signals and said checking signals.

6. A checking circuit comprising: a transformation means, a multi-function means for coincidently generating word signals and checking signals, there being one checking signal for each word generated, said checking signals designating the existence of a corresponding word signal; means for sending said word signals to said transformation means; means for addressing said word signals into said transformation means; means operative in dependence upon said addressing means for generating an indicating signal in response to each of said word signals addressed into said transformation means, said indicating signals thereby having a relationship with said checking signals; combining means for combining said checking signals with said indicating signals; and means responsive to said combining means to designate the presence or absence of said relationship between said indicating signals and said checking signals.

7. A checking circuit comprising: a transformation means; first multi-function means for coincidently generating word signals and checking signals, there being one of said checking signals for each word signal generated, each of said checking signals designating the existence of a corresponding word signal, each of said word signals being of uniform parity and comprising a plurality of bits; means for transferring said word signals into said transformation means; means operative in dependence upon said transferring means for generating in said transformation means an indicating signal in response to the transfer of each of said word signals, said indicating signals thereby having a relationship with said checking signals; combining means responsive to said checking signals; means for sending said word signals and said indicating signals from said transformation means to said combining means, said combining means being operative to combine said checking signals with said indicating signals and to combine the bits of said word signals; and second multi-function means responsive to said combining means to designate the presence or absence of said relationship between said indicating signals and said checking signals, and to designate the parity or lack of parity of said word signals.

8. A checking circuit comprising: a transformation means; first multi-function means for coincidently generating word signals and checking signals, there being one of said checking signals for each word signal generated, each of said checking signals designating the existence of a corresponding word signal, each of said word signals being of uniform parity and comprising a plurality of bits; means for addressing said word signals into said transformation means; means operative in dependence upon said addressing means for generating in said transformation means an indicating signal in response to the addressing of each of said word signals, said indicating signals thereby having a relationship with said checking signals; combining means responsive to said checking signals; means for sending said word signals and said indicating signals from said transformation means to said combining means, said combining means being operative to combine said checking signals with said indicating signals and to combine the bits of said word signals; and second multi-function means responsive to said combining means to designate the presence or absence of said relationship between said indicating signals and said checking signals and to designate the parity or lack of parity of said word signals.

References Cited in the file of this patent

UNITED STATES PATENTS

| | | |
|---|---|---|
| 2,680,240 | Greenfield | June 1, 1954 |
| 2,706,215 | Van Duuren | Apr. 12, 1955 |
| 2,716,156 | Harris | Aug. 23, 1955 |
| 2,721,990 | McNaney | Oct. 25, 1955 |
| 2,744,955 | Canfora | May 8, 1956 |
| 2,911,622 | Ayres | Nov. 3, 1959 |

OTHER REFERENCES

"Introduction to Modern Algebra and Matrix Theory," by Beaumont and Ball, published by Rhinehart and Co., N.Y., copyright 1954, pp. 54–67 relied on.